United States Patent [19]
Barrett

[11] 4,017,730
[45] Apr. 12, 1977

[54] RADIOGRAPHIC IMAGING SYSTEM FOR HIGH ENERGY RADIATION

[75] Inventor: Harrison H. Barrett, Lexington, Mass.

[73] Assignee: Raytheon Company, Lexington, Mass.

[22] Filed: Jan. 16, 1976

[21] Appl. No.: 649,878

Related U.S. Application Data

[62] Division of Ser. No. 465,940, May 1, 1974, Pat. No. 3,936,639.

[52] U.S. Cl. .......................... 250/363 S; 250/505
[51] Int. Cl.² ...................................... G01T 1/166
[58] Field of Search .............. 250/363 S, 366, 505

[56] References Cited

UNITED STATES PATENTS 3,825,757  7/1974  Barrett et al. ................. 250/363 S
3,860,821  1/1975  Barrett .......................... 250/363 S

*Primary Examiner*—Archie R. Borchelt
*Attorney, Agent, or Firm*—David M. Warren; Joseph D. Pannone; Milton D. Bartlett

[57] ABSTRACT

A radiographic imaging system for high energy radiation utilizing a detector of such radiation and a mask having regions relatively transparent to such radiation interspersed among regions relatively opaque to such radiation. A relative motion is imparted between the mask and the detector, the detector providing a time varying signal in response to the incident radiation and in response to the relative motion. The time varying signal provides, with the aid of a decoder, an image of a source of such radiation.

6 Claims, 23 Drawing Figures

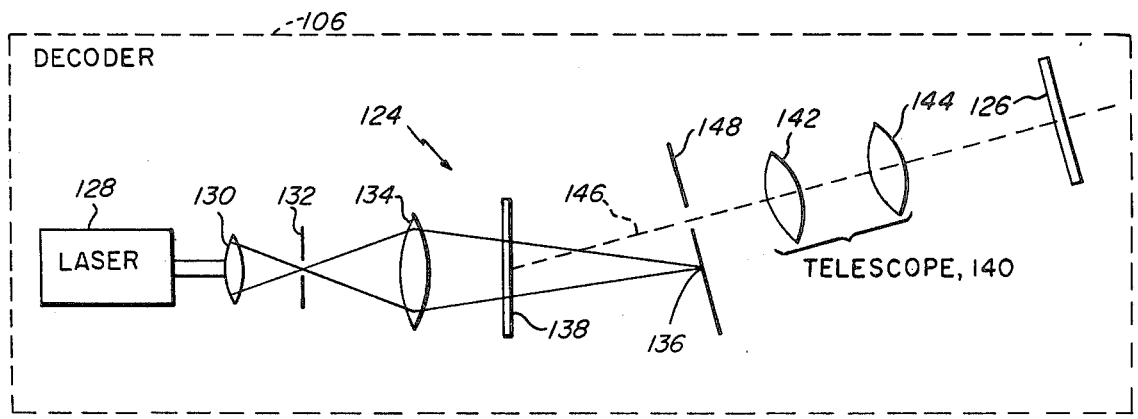
FIG. 6
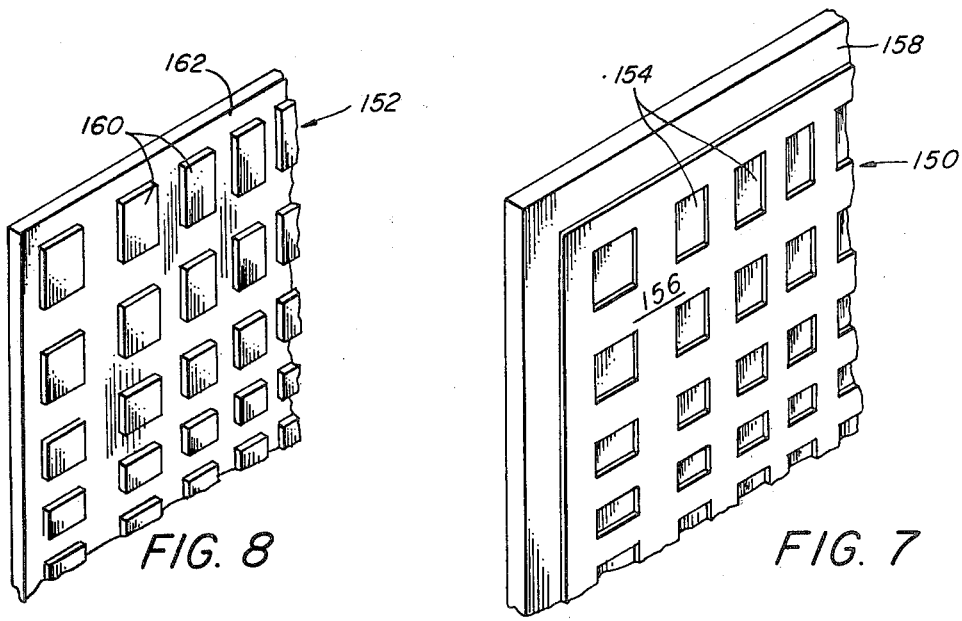
FIG. 8
FIG. 7
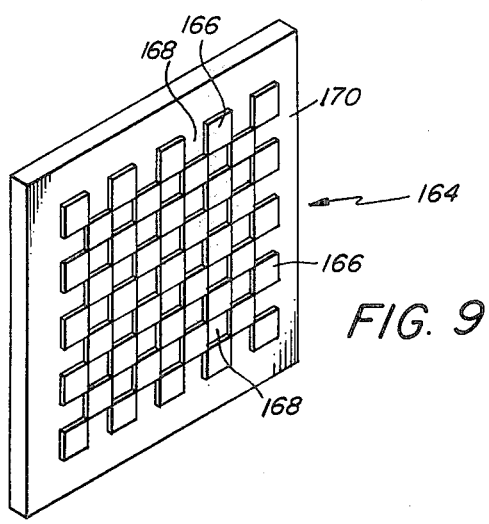
FIG. 9

RADIOGRAPHIC IMAGING SYSTEM FOR HIGH ENERGY RADIATION

CROSS-REFERENCE TO RELATED APPLICATIONS

This is a division of application Ser. No. 465,940, filed May 1, 1974, now U.S. Pat. No. 3,936,639.

BACKGROUND OF THE INVENTION

The production of images of subject matter emitting high energy radiation such as X-radiation, gamma radiation and nuclear particles is more complex than the production of images with visible radiation by an optical lens system because there are no materials available having a sufficient refractive power to focus the high energy radiation. While x-rays have been used in the studies of crystals via the well-known Bragg diffraction technique, and while the focussing of soft x-rays by a Fresnel plate of extremely thin elements is disclosed in U.S. Pat. No, 2,679,474 which issued to W. S. Pajes on May 25, 1954, the only structures utilized for the higher energy radiations, particularly gamma rays, for forming visible images are the collimator disclosed in U.S. Pat. No. 3,011,057 which issued to H. O. Anger on Nov. 28, 1961 and the mask disclosed in U.S. Pat. No. 3,748,470 which issued to H. H. Barrett, the inventor of the present invention, on July 24, 1973. Both the collimator and the mask function by blocking certain rays of radiant energy as distinguished from the Bragg diffraction in which rays of radiation are produced in a direction different from an original direction of propagation from a source of such radiation. A mask adapted for examining a point source of high energy radiation is disclosed in U.S. Pat. No. 3,263,079 which issued to L. N. Mertz and N. O. Young on July 26, 1966 and in a book entitled "Transformations in Optics" by said L. N. Mertz published in 1965 by John Wiley and Sons, Inc. (the adaptation for point source radiation as distinguished from a continuum of radiation being disclosed at page 91 thereof).

The operation of a collimator is distinctly different from that of a mask in that a collimator permits the passage of radiant energy within the collimator tubular apertures only in a direction parallel to the axis of the tubular aperture while a mask, in which the depth of an aperture is smaller than the width of the aperture, the propagation of radiant energy is permitted within the apertures irrespective of the direction of propagation of the radiant energy. As is disclosed in the aforementioned patent to Barrett, the use of a mask provides a greatly increased effective aperture and the imaging of a source of high energy radiation. This is due to the substantial constriction of the propagation of radiant energy provided by the long tubular apertures of a collimator while the relatively thin mask presents no such constriction. An additional distinguishing feature in the use of collimators as compared to masks, noted in the aforementioned Barrett patent, is the coding or scrambling of the image by the mask which necessitates a subsequent decoding or descrambling to make the image visible.

A problem arises in the use of the mask in that the attainable resolution of the resulting image is dependent on the type of detector utilized. For example, if the detector comprises an array of photomultiplier tubes positioned behind a scintillator crystal in the manner disclosed in the aforementioned patents to Anger and Barrett, the resulting resolution of the image is limited by the number of the photomultiplier tubes even though a very fine mask having many apertures per square inch is utilized. For a given sized mask, an array of 19 photomultipliers provides greater resolution than an array of seven photomultipliers. Greater resolution can be obtained by the use of an image intensifier as the detector as is shown in FIG. 12 of the aforementioned Barrett patent. However, there are situations in which th photomultipliers need be used beause of their greater sensitivity.

SUMMARY OF THE INVENTION

The aforementioned problem is overcome and other advantages are provided by a radiographic imaging system employing a mask for spatially modulating radiation propagating therethrough and a detector assembly, the system further providing, in accordance with the invention, means for moving the detector assembly and the mask relative to each other. The mask is provided with, for example, a chirp pattern similar to that disclosed in the aforementioned Barrett patent, or with arcuate zones such as those of an optical Fresnel plate. In one embodiment of the inventon, a mask having an area at least approximately twice as large as the sensory surface of a detector assembly is positioned between the detector assembly and a source of radiation to be imaged, and the detector assembly is scanned about the mask, the detector assembly being an array of photomultipliers placed behind a scintillator and having electrical circuitry responsive to the relative intensities of light flashes of the scintillator received at the photomultipliers for computing the magnitudes of the points of the coded image appearing of the scintillator. The intensity and locations of impinging radiant energy as coded by all points of the mask is obtained by scanning the detector assembly with the result that the resolution obtained upon reconstructing the image from the coded data of the detector assembly has a resolution approximately equal to that which would be obtained from an array of the photomultipliers having a sufficient number of photomultipliers to cover the entire area of the mask.

In a second embodiment of the invention, one or more detectors such as photomultipliers are placed behind a mask positioned at a fixed distance between the detectors and a source of high energy radiation, the mask being scanned in a direction substantially perpendicular to the rays of the radiation. The scanning movement introduces a substantially periodic pulsation to electrical signals provided by each of the detectors, the pattern of the pulsations being related to the pattern of the mask.

In a third embodiment of the invention, an additional stationary mask is introduced in parallel disposition to the moving mask such that the rays of radiation intercept both masks to produce a pulsating electrical signal from each of the detectors. In this embodiment of the invention, the resultant signal waveform is equal to the Fourier transform of the pattern of the source.

With each of these embodiments, a transformation of the image is accomplished at the surface of the detector with an inverse transformation or decoding being provided subsequent to the detection to produce a visible image. With the first embodiment employing the moving detector, the points for all of the scrambled image must first be located whereupon a descrambling of decoding operation similar to that of the aforementioned Barrett patent is accomplished. With the second embodiment, a chirp pattern analogous to that obtained with the equipment of FIG. 11 of the aforementioned Barrett patent is obtained, this scrambled image being descrambled or decoded in a manner analogous to that disclosed in said FIG. 11 such as by the use of a dispersive delay line having a temporal response conjugate to that of the mask pattern. And in the third embodiment, the transformation is that of a Fourier transform which necessitates an inverse Fourier transformation to provide a visible image.

BRIEF DESCRIPTION OF THE DRAWINGS

The aforementioned aspects and other features of the invention are explained in the following description taken in connection with the accompanying drawings wherein:

FIG. 6 is a diagram of an optical system of a decoder in FIG. 4 used in the reconstruction of an image for the display of FIG. 1 for use with a mask having an off-axis Fresnel pattern as disclosed in FIG. 2;

FIG. 7 is an alternative embodiment of the mask of FIG. 2 having a two-dimensional chirp pattern of regions transparent to radiation emitted by the subject of FIG. 1;

FIG. 8 is an alternative embodiment of the mask of FIG. 2 having a two-dimensional chirp pattern of regions opaque to the radiation emitted by the subject of FIG. 1;

FIG. 9 is an alternative embodiment of the screen of FIG. 3 having a checkerboard pattern;

DESCRIPTION OF THE PREFERRED EMBODIMENT

Figure 1:
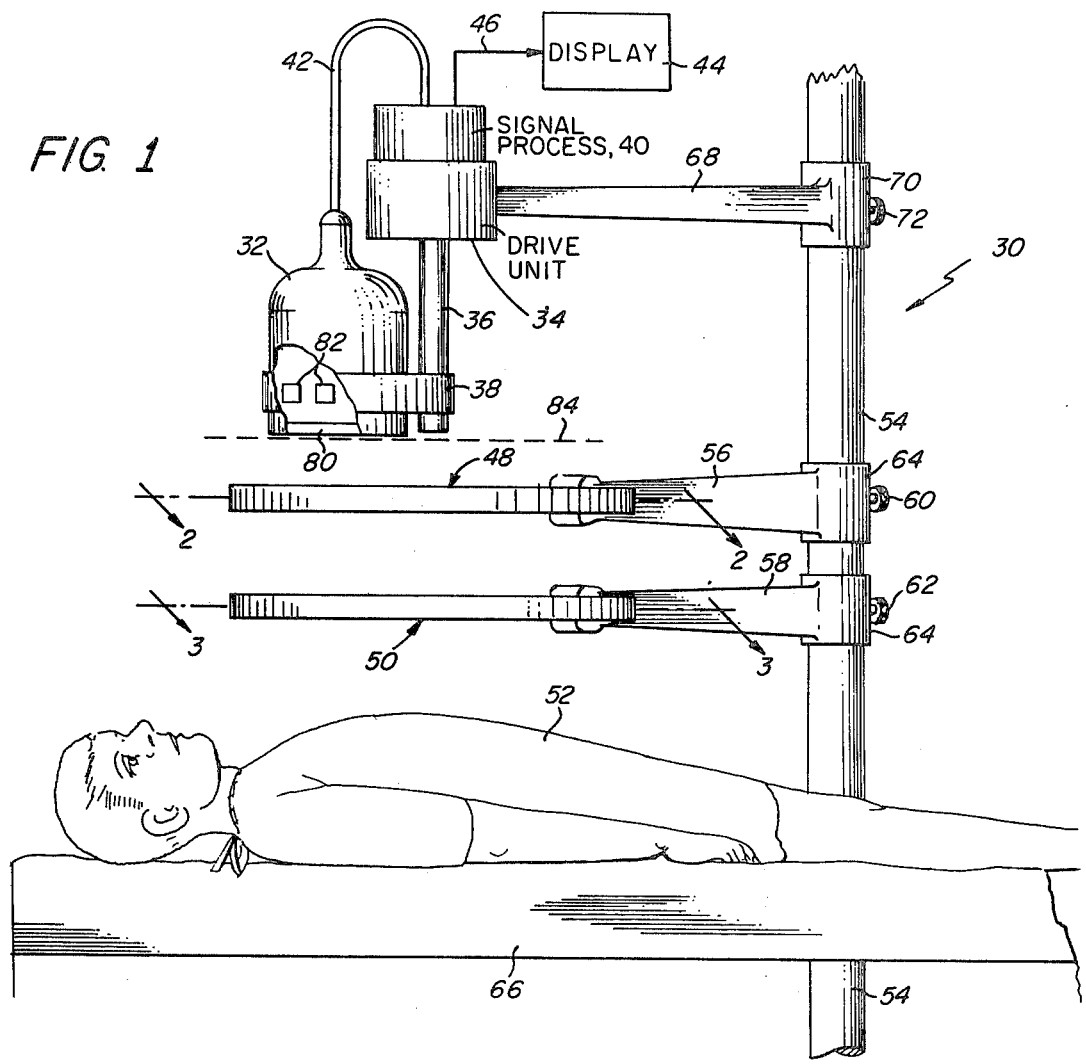
FIG. 1 shows a radiographic imaging system in accordance with one embodiment of the invention employing a rotating detector assembly and a stationary mask positioned above a subject.

Referring now to FIG. 1, there is seen a radiographic imaging system 30, which, in accordance with the invention, comprises a detector assembly 32 constructed in accordance with the teachings of the aforementioned patent to Anger and frequently referred to as an Anger camera, a drive unit 34 coupled to the detector assembly 32 via a shaft 36 having a band 38 secured to an end thereof and encircling the detector assembly 32 for supporting and positioning the detector assembly 32 adjacent the end of the shaft 36, a signal processor 40 coupled via an electrical cable 42 to the detector assembly 32, and a display 44 coupled via line 46 to the signal processor 40. A mask 48 and a second mask 50 which may sometimes be referred to hereinafter as screen 50 are positioned between the detector assembly 32 and a subject 52 by means of a support column 54 and arms 56 and 58 adjustably secured to the support column 54 by knobs 60 and 62 which are threadedly secured to the column 54 and to collars 64 at the ends of the arms 56 and 58.

The subject 52 is shown, by way of example, as a human being who has ingested material which radiates high energy radiation such as gamma radiation. Alternatively, a source of such radiation (not shown in the figure) may be placed beneath the subject 52 in which case he would ingest a radio-opaque dye which would cast a shadow upon the detector assembly 32. The subject 52 is supported by a table 66 secured to the column 54. An arm 68 is secured to the drive unit 34 for supporting the drive unit 34 and the detector assembly 32 above the mask 48, the arms 68 having a collar 70 which is adjustably secured to the column 54 by means of a knob 72 which is tightened against the column 54 and the collar 70.

Figure 2:
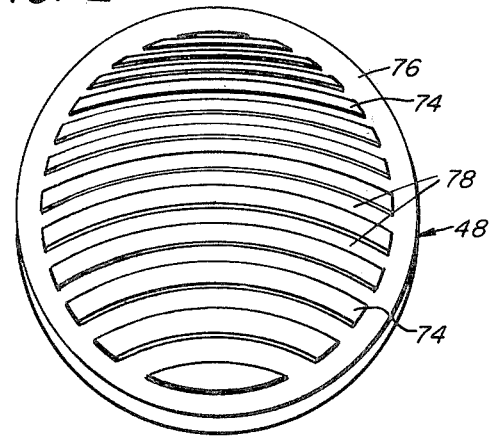
FIG. 2 is a view of a mask taken along the line 2—2 of FIG. 1.
Figure 3:
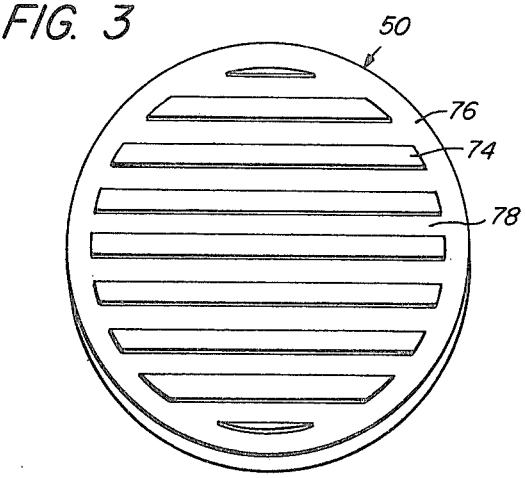
FIG. 3 is a view of a screen taken along the line 3—3 of FIG. 1.

Referring now to FIGS. 2 and 3, there are seen isometric views of respectively the masks 48 and 50 previously seen in elevation view in FIG. 1. In this embodiment of the invention, the mask 48 is composed of arcuate segments and the mask 50 is composed of straight bar-shaped segments of a meterial, such as lead, which is substantially opaque to the radiation omitted by the subject 52 of FIG. 1 and serve as barrier elements which inhibit the passage of quanta of radiation, these opaque regions 74 being supported by a substrate 76 which is substantially tranparent to the radiation, the opaque regions 74 being spaced apart by arcuate regions 78 which are substantially transparent to the radiation. The mask 48 has the configuration of an off-axis Fresnel pattern in which each arcuate region has a successively larger radius. The mask 50 serves simply as a screen which makes the subject 52 appear to be composed of straight strips as viewed by the detector assembly 32, each of the regions of the screen 50 being spaced apart by a distance approximately equal to the average spacing distance of the arcuate regions of the mask 48.

It should be noted that the masks 48 and 50 have a distinctly different structure from that of collimators customarily utilized in x-ray technology. While collimators are provided with tubular apertures permitting the propagation of radiant energy within a tubular aperture only in a direction along the axis of the tube with all other radiant energy being absorbed within the material of the collimator, the masks 48 and 50 have a depth substantially smaller than the spacings between any two opaque regions 74 with a result that radiant energy can propagate in a multiplicity of directions within any one of the transparent regions 78. For this reason, the mask 48 can provide numerous shadow patterns of the off-axis Fresnel configuration in the plane of the face of the detector assembly 32, each of the shadows corresponding to points or sources of radiant energy located within the subject 52. By so varying the intensities of the various rays of radiation propagating in the space of the mask 48, the mask 48 thus spatially modulates the intensity of the radiation and provides a spatial frequency distribution in which the spatial wavelengths are related to the spacings and sizes of the opaque and transparent regions 74 and 78.

As seen in FIG. 1, the detector assembly 32 is partially cut away to partially show a scintillator 80 positioned at the face of the detector assembly 32, and an array of detector elements 82 are spaced apart from the scintillator 80 and positioned behind the scintillator 80 for detecting flashes of light emitted from a multiplicity of locations upon the scintillator 80 in response to impinging quanta of radiant energy emitted from the subject 52. Signals provided by the detector elements 82 in response to the flashes of light are combined, typically via a resistor matrix, to provide signals representing the locations of the light flashes on the scintillator 80, these signals being communicated via the electrical cable 42 to the signal processor 40.

A feature of the embodiment of FIG. 1 is its capability for scanning a relatively large image of the subject 52 with a detector assembly 32 having a viewing area, the area of the scintillator 80, which is smaller than the area of the image. In view of the use of the mask 48, the image incident upon the scintillator 80 is a scramnbled or coded image for reasons explained in the aforementioned patent to Barrett. In order to more clearly describe the relationship between the coded image and the detector assembly 32, an image plane 84 is shown by way of a dashed line and is seen to lie parallel to the face of the mask 48 and to lie in the plane of the face of the detector assembly 32. The drive unit 34 rotates the shaft 36 through one complete revolution during which time the detector assembly 32 is providing electricl signals along the cable 42 representing the intensity of radiation at points within the image plane 84, these intensities representing the composite shadow pattern, referred to above, which pattern is a coded image of the configuration of the sources of radiation within the subject 52. The data of the signals on the cable 42 are stored within the signal processor 40, in a manner to be described, as the detector assembly performs its circular scan of the image plane 84. Upon completion of this scan, the signal processor 40 has data of a scrambled image substantially larger, more than twice as large in area in the embodiment of FIG. 1, than that which could be viewed by the detector assembly 32 if it were to remain stationary.

An interesting feature of the scrambled image is that it may be treated mathematically as a transformation, such as a Fresnel, Fourier, Hadamard or other transformation depending on the format of the mask 48, with the result that not every point in the image plane need be scanned in order to reconstruct a true image of the source configuration within the subject 52 for presentation upon the display 44. Thus, for example, the scanning path of the detector assembly 32 does not cover the area directly beneath the shaft 36; however, the lack of data of that particular part of the image plane 84 does not noticeably degrade the image presented on the display 44.

It is noted that the relative motion introduced between the detector and mask by the system of FIG. 1 is distinctly different from that disclosed in U.S. Pat. No. 3,684,886 which issued to G. Muehllehner on Aug. 15, 1972 wherein there is disclosed the rotation of a collimator relative to a detector. The collimator permits selected rays of radiation from specific points within a subject to be admitted sequentially to the viewing surface of a detector as the collimator is rotated in front of the viewing surface of the detector. In contradistinction, the mask permits rays of radiation from all points within the subject to simultaneously impinge upon the viewing surface of a detector. As a result, the mask permits substantially more radiant energy to impinge upon a detector within an interval of time than does the collimator within an equal interval of time. The system of FIG. 1 is also distinguishable from the moving mask and moving detector of the aforementioned Barrett patent and that there is no relative motion between the mask and detector therein disclosed since both the mask and the detector move together as a single rigid body. In contradistinction, the system of FIG. 1 provides for greatly increased resolution since the coded image presented to the detector results from the use of a mask which is large enough to contain many more opaque and transparent regions which are capable of gathering data sufficient for a high resolution picture, substantially higher than that which can be obtained by a relatively smaller detector assembly wherein the resolution is limited by the geometry of the individual detectors and further limited by the optics of the scintillator itself in which light flashes propagate in a multiplicity of directions in response to the capture of a single photon of high energy radiation.

With respect to the improved resolution, it is noted that imaging systems of the prior art, whether they utilize collimators or masks, employ elements positioned between the source of radiation and the detector and having a cross-sectional area no larger than the viewing area of the detector. No matter how fine a collimator or how fine a mask is utilized, the utltimate attainable resolution is limited by the resolving power of the detector itself. The system of FIG. 1 avoids this problem of creating a synthetic viewing area by scanning the detector assembly about a coded image which may be many times larger than the viewing area of the detector assembly thereby providing a many fold increase in the effective viewing area of the detector assembly and a corresponding many fold increase in the attainable resolution.

Figure 4:
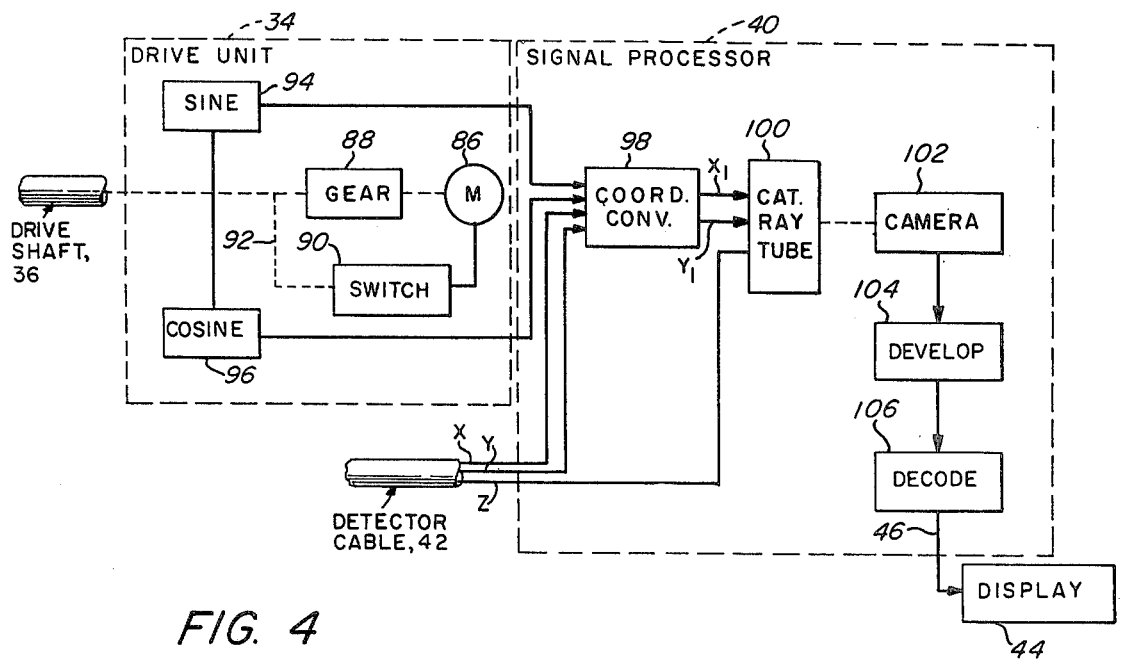
FIG. 4 is a block diagram of a drive unit and signal processor of the embodiment of FIG. 1.

Referring now to FIG. 4, there is seen a block diagram of the drive unit 44 and the signal processor 40 of FIG. 1, FIG. 4 also showing the display 44, cable 42 and drive shaft 36 previously seen in FIG. 1. The drive unit 34 comprises an electric motor 86 which drives through gear train 88 to rotate the shaft 36. A switch 90 is mechanically coupled via a dotted line 92 to the drive shaft 36 for deenergizing the motor 86 to stop rotation of the shaft 36 upon completion of one revolution of the shaft 36. Thereby the drive unit 34 rotates the detector assembly 32 of FIG. 1 through one complete revolution whereupon the scanning motion is stopped. The drive unit 34 also comprises sine and cosine generators 94 and 96 which are mechanically coupled to the shaft 36 for providing respectively the sine and the cosine of the angle of rotation of the shaft 36 to the signal processor 40.

The signal processor 40 comprises a coordinate converter 98 which is coupled to the sine and cosine generators 94 and 96 and is also coupled to the X and the Y signal lines of the cable 42, a cathode-ray tube 100 which may be provided with a long persistence phosphor for storing an image on its face, a camera 102 positioned for photographing an image on the face of the cathode-ray tube 100, a developing system 104 and a decoder 106 which is coupled via line 46 to the display 44.

The signal processor 40 provides the two functions of combining the various portions of the scrambled image detected by the detector assembly 32 as it scans along the image plane 84, and decodes the scrambled image to provide a true image for the display 44. The coordinate converter 98 provides two well-known conversions, a rotation of the coordinate X and Y axes amd a translation of the coordinate system, for providing an image which is stabilized against the rotation of the detector assembly 32 and stabilized against the translation of the detector assembly 32 as it is moved from one side of the shaft 36 to another side of the shaft 36. The stabilized X signal and the stabilized Y signal are shown as X1 and Y1 and the output of the coordinte converter 98. The X1 and Y1 signals represent the true positions within the image plane 84 of detector photons or quanta of radiation independently of the translational and rotational movement of the detector assembly 32.

The Z axis signal provided by the cable 42, which signal represents the energy of a detected photon, as applied to the Z axis of the cathode-ray tube 100 while the electron beam of the cathode-ray tube 100 is deflected in accordance with the magnitudes of the X1 and the Y1 signals. Thus, there is provided upon the face of the cathode-ray tube 100 a complete view of the scrambled image within the image plane 84 as detected by the detector assembly 32.

The camera 102 photographs the image on the face of the cathode-ray tube 100 whereupon the film plate of the camera 102 is transferred to the developing system 104 which provides a transparency of the scrambled image, this tranparency then being transferred to the decoder 106 for reconstruction of the true image. The reconstruction process of the decoder 106 will be described hereinafter with reference to FIG. 6.

Figure 5:
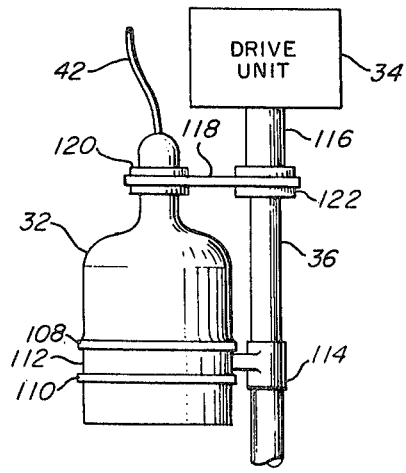
FIG. 5 is an alternative structure for the embodiment of FIG. 1 wherein the detector assembly is driven in a circular path without rotation about the axis of the detector assembly.

Referring now to FIG. 5, there is shown an alternative embodiment of the scanning mechanism of FIG. 1 which is seen to comprise the detector assembly 32 fitted with upper and lower ball bearing raceways 108 and 110 between which a supporting collar 112 is rotatably nested. The collar 112 is attached to the shaft 36 via a second collar 114. The drive unit 34 is provided with a stationary cylindrical tube 116 positioned coaxial to and external to the shaft 36 whereby the shaft 36 can be rotated by the drive unit 34 in the manner disclosed previously in FIG. 1. A belt or chain 118 is coupled from the neck of the detector assembly 32 to the tube 116 by a sprocket wheel 120 affixed about the neck of the detector assembly 32 and by a sprocket wheel 122 affixed to the end of the tube 116. Upon rotation of the shaft 36, the sprocket wheel 122 remains stationary so that, as the detector assembly 32 rides around the common axis of the shaft 36 and the tube 116, the chain 118 urges the sprocket wheel 120 and the detector assembly 32 to rotate equally and oppositely the rotation of the shaft 36 so that the detector assembly 32 undergoes pure translational motion during its scanning of the image plane 84 of FIG. 1 rather than the aforementioned combined translation and rotation obtained with the embodiment of FIG. 1. While the mechanical system of FIG. 5 is more complex than that of FIG. 1, the conversion operation required by the coordinate converter 98 of FIG. 4 is substantially reduced in that there is no rotation of the coordinate X and Y axes. The embodiment of FIG. 5 is useful when it is desired to avoid the well-known multiplication of the X and Y signals by the sine and cosine factors as is done in a rotating axis transformation.

Referring now to FIG. 6, there is seen a diagrammatic representation of an optical system 124 utilized in reconstructing an image on a screen 126 from the coded photograph of the camera 102 and the developing system 104 of FIG. 4. The screen 126 may serve as the display 44 of FIG. 4, or, alternatively, the display 44 may comprise an optical projection system (not shown in the figures) for projecting the image of the screen 126 upon a console or other viewing area. Since the developing system 104 provides a transparency, this transparency is a form of hologram formed by the off-axis Fresnel zone plate pattern of the mask 48. The optical system 124 comprises a light source 128 which is advantageously a laser providing coherent illuminaton, a converging lens 130 which converges the rays of light through an iris 132 whereupon they impinge upon a second converging lens 134 which brings the light rays to focus at a focal point 136. The transparency provided by the developing system 104 is identified here by the reference numeral 138 and is placed behind the lens 134 so that the rays of light exiting from the lens 134 pass through the transparency 138 on their way to the focal point 136. A telescope 140 comprising converging lenses 142 and 144 is angled along axis 146 relative to the axis of th lens 134. The telescope 140 observes diffracted light passing in the general direction of the axis 146 and through an iris 148 to image this light upon the screen 126. The optical system 124 is utilized for decoding images formed uon the transparency 138, which coded images were formed by the mask 48, of FIG. 1, having the form of an off-axis Fresnel pattern. If a mask having some other form of spatial modulation pattern is employed in the system 30 of FIG. 1, another form of decoding or matched filtering such as that disclosed in the aforementioned patent to Barrett is utilized. The orientation of the telescope 140 along the angled axis 146 corresponds with the off-axis focussing of an off-axis Fresnel plate. The light which is brought to a focus at the focal point 136 is blocked by an opaque portion of the iris 148 so as to form no portion of the reconstructed image on the screen 126. As is apparent from FIG. 6, the use of an off-axis Fresnel pattern mask provides a coded image on the transparency 138 which can be advantageously decoded with relatively few optical elements.

Referring now to FIGS. 7 and 8, there are shown isometric views of portions of two alternative embodiments of the mask 48 of FIG. 1, the embodiment of FIG. 7 being identified by the reference numeral 150 and that of FIG. 8 by the reference numeral 152. Each of the masks 150 and 152 have a pattern of regions which decrease in size and in spacing monotonically in both the X and the Y coordinate directions. The mask 150 has rectangular transparent regions 154 in the form of apertures in a plate 156 of lead or other material opaque to high energy radiation deposited upon a substrate 158. The mask 152 has rectangular opaque regions 160 composed of lead or other material opaque to high energy radiation and deposited upon a substrate 162 in the same positions as were occupied by the transparent regions 154 of the mask 150.

Referring now to FIG. 9, there is shown an alternative embodiment of the screen 50 of FIG. 1 which is here identified by the reference numeral 164 and is seen to comprise a checkerboard pattern of opaque and transparent regions 166 and 168 formed of the same materials as is utilized in the masks 150 and 152, the opaque regions 166 being deposited upon a transparent substrate 170 in a manner in which the opaque regions 160 of FIG. 8 are deposited upon the transparent substrate 162. The screen 164 is advantageously used with either the mask 150 or the mask 152 in a manner analogous to the use of the screen 50 with the mask 48 in FIG. 1. Here, too, the screen 164 modifies the view of the subject 52 of FIG. 1 as seen by the detector assembly 32 to appear as being composed of many small points rather than a continuum so that the subject 52 appears to have a spatial frequency characteristic of a passband offset from zero frequency. The sizes and spacings of the regions upon the screen 164 are approximately equal to the average size and average spacing of the regions of the masks 150 and 152.

In addition, the use of the off-axis Fresnel zone pattern provides the image at an angle to the main axis of the optical system. This is most advantageous for an optical reconstruction employing an optical system such as that of FIG. 6 in that the resulting image is not obscured by the so-called zero order term associated with holographic reconstructions. It is believed that with respect to the aforementioned patent to Mertz dealing with a reticle camera for photographing stars, his camera was not adapted to the photography of continuous objects such as the subject 52 of FIG. 1 because his system did not provide for the use of a half-tone screen. It is also interesting to note that the true image appearing upon the screen 126 does not appear as a striped image as seen through th screen 50, but is, in fact, an accurate image of the radiating region of the subject 52 since the high frequency optical modulation associated with the half-tone screen is filtered out by the optical system 124 of FIG. 6 in a manner analogous to the filtering out of a radio frequency carrier by a radio receiver.

Figure 10:
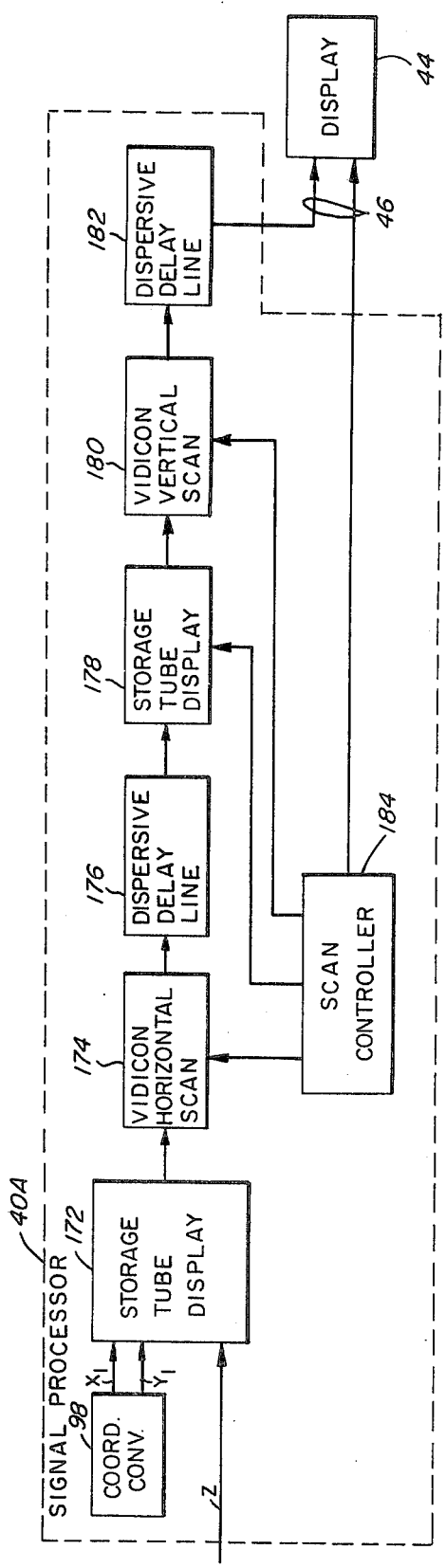
FIG. 10 is a block diagram of a signal processor for use in the embodiment of FIG. 1 with the masks of FIG. 7 or FIG. 8 and embodying a dispersive delay line for processing analog signal.
Figure 11:
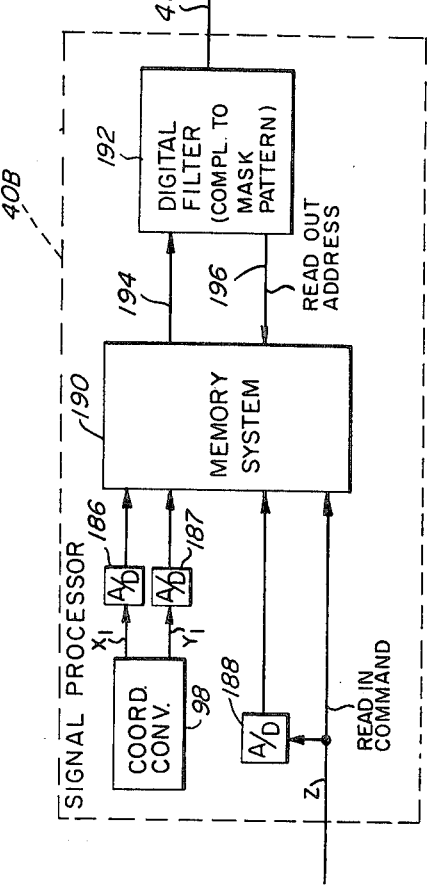
FIG. 11 is a block diagram showing a digital implementation as an alternative embodiment of the signal processor for FIG. 10.

Images produced by the masks 150 or 152 by themselves or in combination with the screen 164 are processed electronically rather than optically, as will be disclosed with reference to FIGS. 10 and 11, and, accordingly, the aforementioned deleterious effect of a zero spatial frequency term in the optical processing is greatly reduced in the electrical processing of the two-dimensional chirp patterns of the masks 150 and 152.

It is interesting to note that the optical system 124 of FIG. 6 extracts three-dimensional data from the transparency 138. Details of various horizontal strata or layers within the subject 52 may be individually brought into focus upon the screen 126 by the positioning of the optical elements of the optical system 124. An analogous focussing effect by means of the mask 150 has already been disclosed in the aforementioned patent to Barrett. Thus, it is seen that the system of FIG. 1 readily provides tomographic data of the subject 52.

Referring now to FIG. 10, there is shown an alternative embodiment of the signal processor 40 of FIG. 1, this embodiment being identified by the reference numeral 40A and being adapted for use with the masks 150 and 152 in the system 30 of FIG. 1. The signal processor 40A is seen to comprise the coordinate convertor 98 which is coupled to the cable 42 and to the drive unit 34 in a manner previously seen in FIG. 4, a storage tube display 172 coupled to the X1, the Y1 and the Z signals in the same manner as disclosed in FIG. 4 for the cathode-ray 100, a vidicon 174, a dispersive delay line 176, a storage tube display 178 similar to the storage tube display 172, a vidicon 180, a dispersive delay line 182 and a scan controller 184 which provides timing signals for sychronizing the operation of the vidicons 174 and 180, the storage tube display 178 and the display 44.

In operation, the signal processor 40A provides an image for the display 44 in a manner in the aforementioned patent to Barrett. Briefly, the storage tube display 172 provides a stored image similar to that displayed by the cathode-ray tube 100 of FIG. 4, but differing therefrom in that the image on the storage tube display 172 has been obtained by the use of the mask 150 or 152 while that appearing in the cathode-ray tube 100 was obtained by the use of the mask 48. Each point source of radiation within the subject 52 provides a shadow of the mask 150 or 152 upon the image plane 84. A composite of the shadows for each of the individual point sources of the subject 52 is presented on the storage tube display 172. The horizontal lines of this display are scanned by the vidicon 174 with the output signal of the vidicon 174 being a summation of chirp waveforms corresponding to the composite shadow of th individual horizontal lines of the mask 150 or 152. The delay line 176 has a temporal impulse response inverse to that of the chirp signal of the vidicon 174 so that the delay line 176 functions as matched filter to produce on the storage tube display 178 a succession of markings representing the horizontal component of the point sources within the subject 52. The storage tube display 178 is, in turn, scanned in the vertical direction by the vidicon 180, the vidicon 180 similarly providing composite chirp signals which are applied to the delay line 182. The delay line 182 functions in a manner analogous to the delay line 176 to provide a matched filtering operation upon the signals of the vidicon 180 thereby producing a succession of points to be displayed on the display 44, each of these points being in a position corresponding to the positions of the point sources of radiation within the sibject 52. Thus, the display 44 shows an image of the subject 52. Thus, the display 44 shows an image of the radioactive region within the subject 52.

Referring now to FIG. 11, there is shown another alternative embodiment of a signal processor 40 of FIGS. 1 and 4, this embodiment being identified by the reference numeral 40B. The signal processor 40B comprises the same coordinte converter 98 as does the signal processor 40A of FIG. 10 and utilizes the X1, Y1 and Z signals as does the signal processor 40A. The signal processor 40B processes these signals digitally while the signal processor 40A processes the signals in an analog manner. Accordingly, the signal processor 40B comprises analog-to-digital converters, each referred to hereinafter as A/D, having the reference numerals 186, 187 and 188 for converting respectively the X1, the Y1 and the Z signals to digital signals which are then applied to a memory system 190 which stores each of the digital signals as specific locations within the memory system 190 corresponding to the positional data storage of the storage tube display 172 of FIG. 10. The Z signal is also applied directly to the memory system 190 to serve as a read command for entering the digital data from the A/D's 186–188. The signal processor 40B also comprises a digital filter 192 coupled between the memory system 190 and the display 44 for digitally implementing a two-dimensional matched filtering or convolution operation corresponding to that of the delay lines 176 and 182 of FIG. 10. The digital filter 192 comprises elements well known in the computer arts such as arithmetic units, shift registers and an internal program utilizing digital techniques analogous to those taught in U.S. Pat. No. 3,517,173 which issued to M. J. Gilmartin, Jr. et al on June 23, 1970 and U.S. Pat. No. 3,662,161 which issued to G. D. Bergland on May 9, 1972, both of which deal with Fast Fourier Transform processors, and U.S. Pat. No. 3,742,201 which issued to H. L. Groginsky on June 26, 1973 dealing with an orthogonal digital waveform transformer. The specific digital operation provided by the digital filter 192 depends on the specific pattern utilized in the masks of FIG. 1, whether they be a Fresnel pattern as in the mask 48, or a regular monotonic pattern in a digital format as shown in the masks 150 and 152 or a random pattern (not shown) in which the spacings and/or the sizes of the transparent and opaque regions have numerical dimensions obtained from a random number generator, as well as on the configuration of the screens, if utilized, such as the screens 50 and 164. When the masks 150 or 152 are utilized, the digital filter 192 has reference data which may be provided within the digital filter to itself or within the memory system 190, the reference data being the specific shapes, sizes and positions of the opaque and transparent regions of the masks for use in providing a correlation or masked filtering operation of the data from the X1, Y1 and Z signals. The data stored within the memory system 190 is read out along line 194 to the digital filter 192 in response to a read-out address on line 196 as provided by the digital filter 192.

Figure 12:
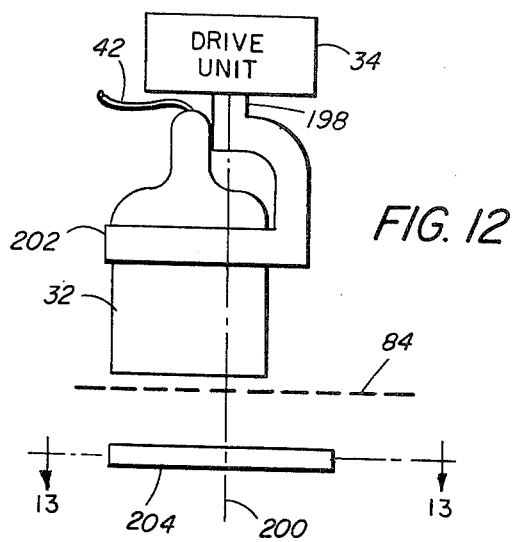
FIG. 12 shows a detector assembly for the embodiment of FIG. 1 wherein the axis of rotation is offset from the axis of the detector assembly by an amount smaller than a radius of the detector assembly.

Referring now to FIG. 12, there is seen yet another embodiment of the scanning mechanism of FIG. 1 in which the drive unit 34 rotates the detector assembly 32 via a shaft 198 about an axis 200 passing through the detector assembly 32, the detector assembly 32 being fitted with a collar 202 affixed near the top of the detector assembly 32 for mechanically supporting the detector assembly 32 at the end of the shaft 198. It may be recalled that, with reference to FIG. 1, there is a space in the image plane 84 directly beneath the shaft 36 which is not scanned by the detector assembly 32 as it is rotated about the shaft 36. With the embodiment of FIG. 12, the rotation axis 200 is at the center of the scanned area of the image plane 84. Since the axis 200 passes directly through the face of the detector assembly 32, the area directly beneath the shaft 198 is scanned by the detector assembly 32. Here, too, the area of the image plane 84 which is scanned is substantially larger than the area of the face of the detector assembly 32, for example, approximately twice as large and, accordingly, the scanning arrangement of FIG. 12 also provides for a substantial increase in the attainable resolution.

As was disclosed with reference to FIG. 6. the Fresnel pattern is a useful pattern for a mask, such as the mask 48, since the resulting scrambled image is readily decoded optically. With respect to the scanning mechanism of FIG. 12, it is noted that a maximum amount of data is obtained in the vicinity of the axis 200 since that region is scanned approximately twice as much as the remaining portion of the image plane 84 due to the fact that the detector assembly 32 overlaps both sides of the axis 200. Accordingly, it is desirable that the mask 204 have many zones, or opaque and transparent regions, such as the zones of a Fresnel zone plate located in the vicinity of the axis 200. However, the Fresnel zone plate has a minimum number of zones at its center portion with the smaller zones of higher spatial frequencies appearing further out away from the center of the Frensel zone plate.

Figure 13:
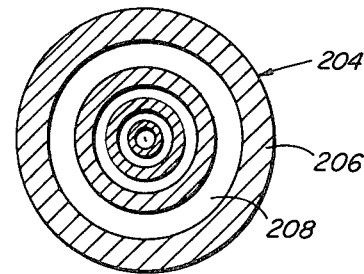
FIG. 13 is a plan view of a mask similar to that of FIG. 2 but having an inverse Fresnel pattern.

Referring now to FIG. 13, there is shown a plan view of a mask 204 which has a pattern inverse to that of the Frensel pattern. The opaque regions 206 and the transparent regions 208 have minimal widths at the central portion of the mask 204 with successive ones of these zones or regions 206 and 208 having larger widths and increased distances from the center of the mask 204, the largest regions being near the outer periphery of the mask 204. If a transparency resulting from a single point source in cooperation with the mask 204, were positioned at the location of the transparency 138 in the optical system 124 of FIG. 6, in lieu of the focal point 136, there would appear a focal ring. However, system to be described with reference to FIG. 14 can be utilized to decode images formed with the mask 204 in the same manner as the system 124 of FIG. 6 is utilized to decode images formed with the mask 48 of FIG. 1. In particular, it is noted that the mask 204 has a relatively high concentration of relatively fine zones in the vicinity of the axis 200 which is at a distance of approximately one-half radius from the center of the detector assembly 32 of FIG. 12, these zones having a relatively high spatial frequency compared to the zones near the periphery of the mask 204 and thereby maximizing the ample data provided in th region of the axis 200 for obtaining high resolution of the image plane 84. Many of these fine zones pass near the center of the detector assembly 32 which, in the case of an Anger camera, is the region of best resolution of the detector assembly 32, therefore making best use of the fine zones in obtaining a high resolution image.

Figure 14:
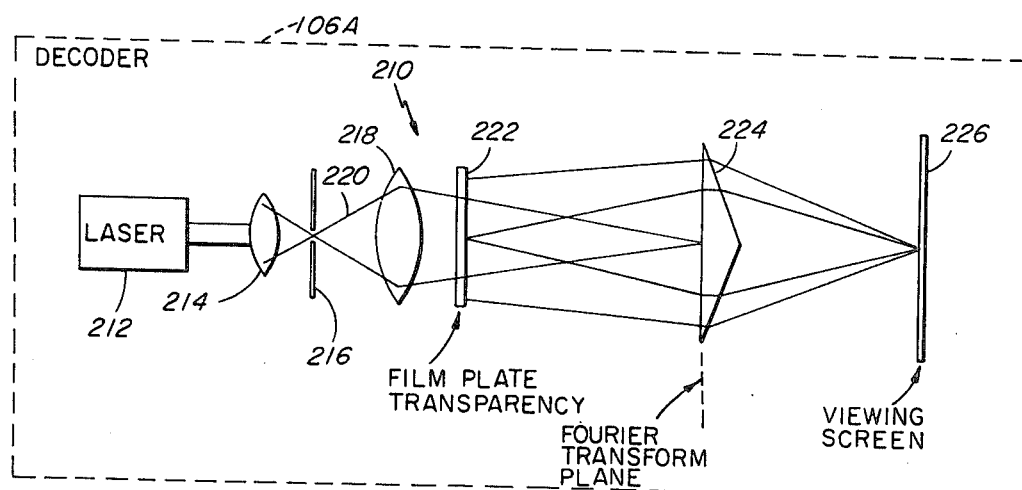
FIG. 14 is a diagram of an optical system, alternative to that of FIG. 6, for reconstructing an image obtained with the mask of FIG. 13.

Referring now to FIG. 14, there is seen an optical system 210 in which light from a laser 212 is focussed via a converging lens 214 through an iris 216 to a second converging lens 218, rays of the light being indicated by lines such as the line 220 which passes through the iris 216. The use of the mask 204 with the scanning mechanism of FIG. 12 in the imaging system of FIG. 1 produces a transparency 222 in FIG. 14 which is analogous to the transparency 138 of FIG. 6. The transparency 222 differs from the transparency 138 because the coding of the mask 204 of FIG. 13 differs from that of the mask 48 of FIG. 2. The transparency 222 is placed immediately behind the lens 218 in FIG. 14 in a manner analogous to that shown in FIG. 6 wherein the transparency 138 is placed immediately behind the lens 134. And as will be seen, the optical system 210 decodes the transparency 222 in a manner analogous to the decoding of the transparency 138 by the optical system 124. Accordingly, the optical system 210 serves as an alternative embodiment of the decoder 106 of FIG. 4 identified in FIG. 14 by the reference numeral 106A. The decoder 106A is substituted for the decoder 106 in the embodiment of FIGS. 1 and 4 when the mask 204 of FIG. 13 is utilized in the imaging system of FIG. 1.

The optical system 210 of FIG. 14 further comprises a conical prism in the shape of a right circular cone and known commercially as an axicon which is identified by the reference numeral 224, and a screen 226 which is analogous to the screen 126 of FIG. 6 and upon which a reconstructed view of the subject 52 of FIG. 1 is presented. With respect to the operation of the prism 224, it is noted that if the prism 224 were placed adjacent to and behind the transparency 222, and the transparency 222 were illuminated by collimated light, then the focal ring (analogous to the focal point produced by a standard Fresnel zone plate) would be focussed by the prism 224 to a point. Since the subject 52 of FIG. 1 has many point sources of radiant energy, there are many focal rings to be focussed by the prism 224. It is noted that the centers of the focal rings are positioned at points corresponding to the point sources of the subject 52 and, accordingly, do not necessarily fall upon the axis of the optical system 210. Accordingly, in order for the prism 224 to reconstruct image points upon the screen 226 corresponding to each of the focal rings, the prism 224 is spaced at a distance from the transparency 222, the prism 224 being positioned at the Fourier transform plane of the lens 218 (at the back focus thereof) since, as is well known in the field of optics, the Fourier transform is invariant to lateral displacements except for a phase factor. Thus, a point focus can be produced by the prism 224 corresponding to each of the positions of the point sources within the subject 52. The optical system 210 has provided good reconstruction of coded images.

Figure 15:
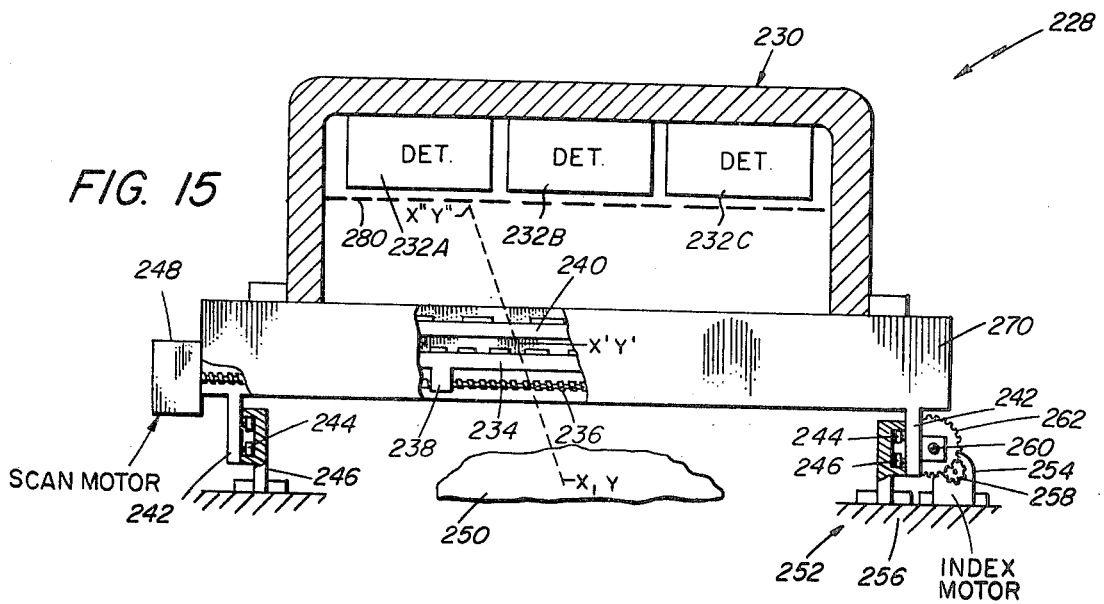
FIG. 15 shows an elevation view of an alternative embodiment of the invention, partially cut away to show a pair of masks placed adjacent each other, at least one of the masks being moved relative to a plurality of detectors.

Referring now to FIG. 15, there is seen an elevation view, partially in section and partially cut away, of another embodiment of the invention providing a relative motion between a mask and a detector, the mask being placed between a subject and the detector as was previously disclosed in the system of FIG. 1. The relative motion in the embodiment of FIG. 15 is a linear movement as compared to the translation in a circular path as disclosed in FIG. 5 and the translation plus rotation as disclosed in FIG. 1. The relative motion in FIG. 15 is produced by a scanner 228 which comprises a frame 230 supporting at least one detector, three such detectors 232A-C being shown in the figure, a mask 234 seen in a cut away portion of the frame 230, a drive screw 236 and a threaded rider 238 thereon which is mechanically coupled to the mask 234 and translates with the mask 234 in a direction parallel to the axis of the drive screw 236 during rotation of the drive screw 236, a mask 240 positioned above the mask 234 and adjacent thereto, legs 242 affixed to the bottom portion of the frame 230 and being provided with guide wheels 244 which roll within rails 246 which have been sectioned to better show the guide wheels 244 and a scan motor 248 for rotating the drive screw 236 to impart a scanning motion to the mask 234 transversely of a subject 250. Also shown is index drive unit 252 comprising an index motor 254 affixed to the rail 246 by a base 256, the index motor 254 having a pinion 258 which rotates a drive screw 260, perpendicular to the drive screw 236, via a gear 262 which measures with the pinion 258 and is attached to the drive screw 260.

The scanner 228 has provisions for driving only the lower mask 234 relative to the detectors 232A-C and the upper mask 240. However, it is also contemplated by the invention that an additional drive unit (not shown) may also be provided for moving the mask 240 relative to the mask 234 and relative to the detectors 232A-C.

Figure 16:
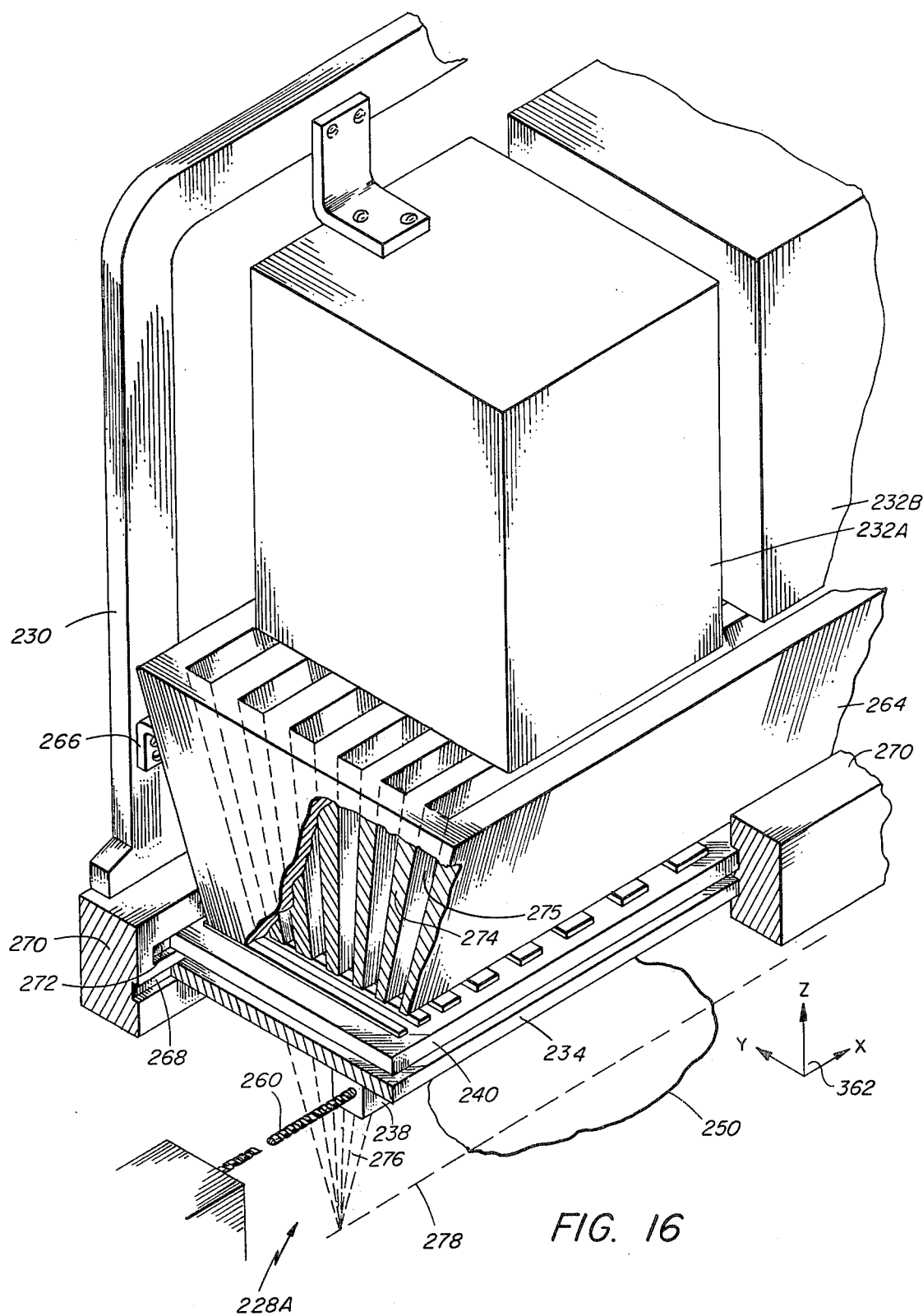
FIG. 16 shows a partial isometric view of the embodiment of FIG. 15 further including a collimator partially cut away to show slotted apertures therein.

Referring also to FIG. 16, there is shown an isometric view, partially cut away and partially sectioned, of a scanner 228A similar to the scanner 228 of FIG. 15 but further comprising a collimator 264 attached by brackets 266, one such bracket being seen in the figure, to the frame 230. Also seen in FIG. 16 are the lower and upper masks 234 and 240 and the detector 232A. The frame 230 is seen to have slots 268 situated within cross members 270 for supporting and guiding the mask 234 as it is slid back and forth by the drive screw 236 of FIG. 15. Slots 272 support the mask 240. The collimator 264, as seen in the cut away view thereof, comprises septa 274 which run lengthwise through the collimator and transversely of the subject 250 providing slots 275 therebetween through which rays 276 of radiant energy propagate to the detector 232A. Each of the masks 230 and 240 have identical patterns, each pattern being a chirp pattern of opaque and transparent regions in which the widths of the opaque and transparent regions are monotonically increasing in a direction transversely of the subject 250, the two masks 234 and 240 having their chirp patterns oriented in the same direction. The collimator 264 thereby provides for a focussing along a line 278 within the subject 250 of the rays 276 which propagate through the transparent regions of the mask 234, the transparent regions of the mask 240 and through the slots 275 to the collimator 232A. The scanner 228A provides a line scan, the line 278 being one such line, whereupon the index drive 252 of FIG. 15 repositions the frame 230 longitudinally of the subject 250 so that a second line displaced from and parallel to the line 278 can then be scanned. It is noted that the pattern of opaque and transparent regions of the mask 240 and of the mask 234 is similar to any one row or any one column of the mask 152 of FIG. 8. As will be explained subsequently, the use of the pair of masks 234 and 240 in which there is a relative motion between the masks themselves results in a coded or scrambled image upon an image plane 280 which lies at the front faces of the detectors 232A-C. This scrambled image is in fact a Fourier transform of the subject matter on the line 278, a system to be described with reference to FIG. 17 providing for the inverse Fourier transformation of the scrambled image and presenting sequential line images upon a display for successive positions of the line 278.

Figure 17:
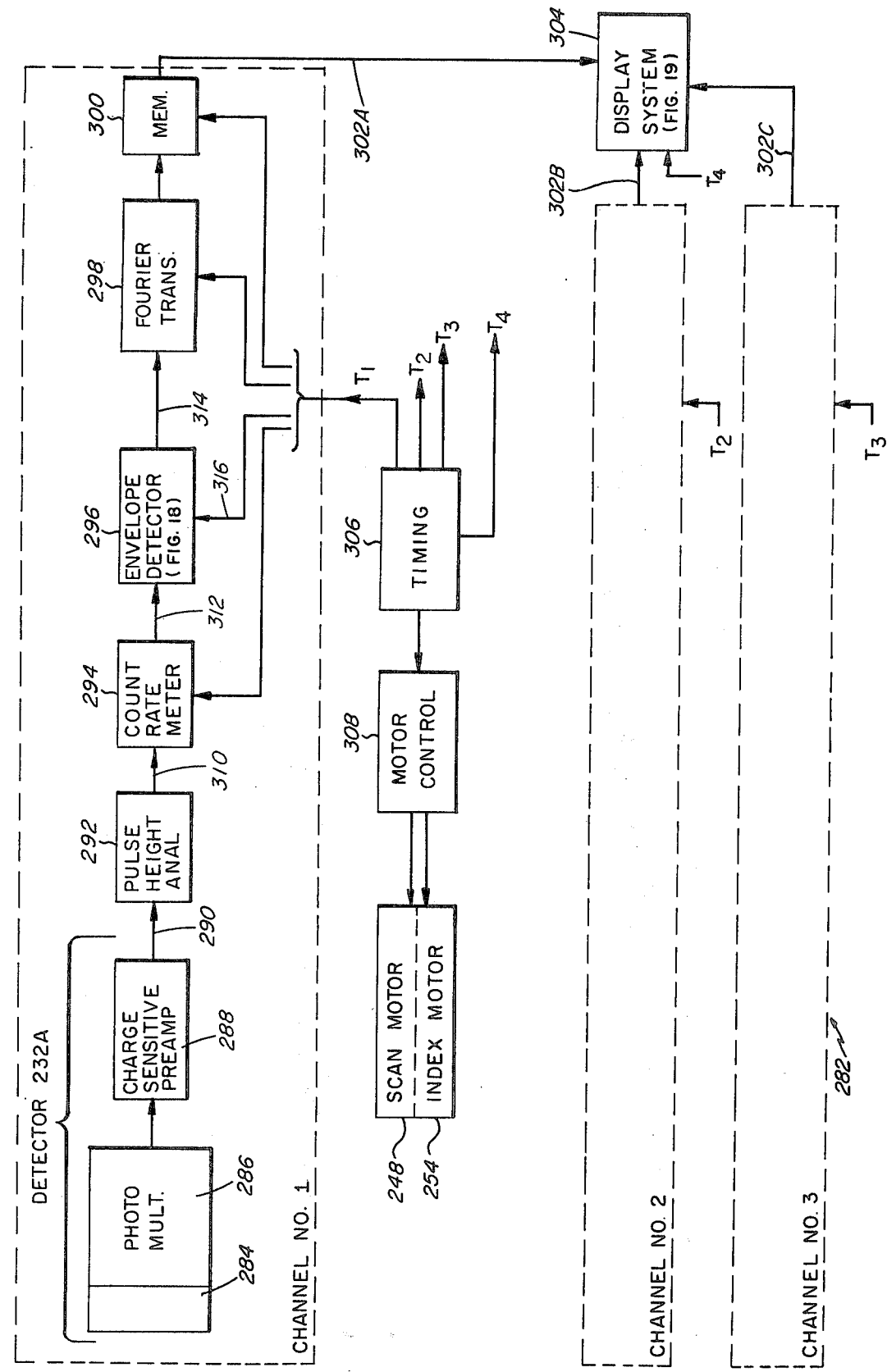
FIG. 17 is a block diagram of an imaging system incorporating the scanning structure of FIG. 15.

Referring now to FIG. 17, there is seen a block diagram of a system 282 for use with the scanners 228 and 228A to decode the image of the image plane 280 and to combine the decoded images of successive line scans to provide a complete picture of the radioactive regions of the subject 250. The system 282 is seen to comprise three channels corresponding to each of the three detectors 232A-C of FIG. 15. In the ensuing discussion, the suffixes A, B and C will be dropped from the reference numerals 232A-C when it is to be understood that the teachings apply equally well to ach of the detectors 232.

Each channel comprises the detector 232 which includes a scintillator 284, a photomultiplier 286 and a charge sensitive preamplifier 288 which provides an output pulse on line 290 having a magnitude proportional to the total energy of the successive light flashes produced by the scintillator 284 in response to the impact of a single high energy photon emitted by the subject 250 of FIGS. 15 and 16. The preamplifier 288, as is well known in the nuclear art, typically comprises a capacitive storage circuit having a decay time approximating the interval of time during which the light flashes are produced by the scintillator. Each channel further comprises a pulse height analyzer 292, a count rate meter 294, an envelope detector 296 which will be further described with reference to FIG. 18, a Fourier transformer 298 and a memory 300. The outputs of the memories 300 in each of the channels are coupled via lines 302A-C to a display system 304 which will be described further with reference to FIG. 19. Timing signals for operating the count rate meter 294, the envelope detector 296, the Fourier transformer 298 and the memory 300 in each of the channels, as well as the display system 304, are provided by a timing unit 306 along cables T1, T2, T3 and T4. The timing unit 306 also transmits timing signals to a motor control circuit 308 which, in response to these timing signals, energizes the scan motor 248 and the index motor 254 of FIGS. 15 and 17 for scanning the mask 234 at a predetermined speed and for indexing the frame 230 between successive ones of the scans.

In operation, therefore, the scintillator 284 emits flashes of light in response to impinging high energy photons, the flashes of light being converted to electrical signals by the photo-multiplier 286 which signals, in turn, are applied to the preamplifier 288 which provide the aforementioned pulses representing the total energy of the light flashes and, hence, of the impinging high energy photon. The pulse height analyzer 292 provides a signal on line 310 whenever the magnitude of the signal on line 290 is greater than a predetermined threshold but less than a second predetermined threshold to ensure that the signals on line 310 substantially avoid the effects of background radiation noise. The count rate meter 294 is typically a counter which, in accordance with timing signals provided by the timing unit 306 is enabled to count the number of signals appearing on line 310 within a preset interval of time and is thereafter reset for counting the signals in the next interval of time. Thus, the output of the count rate meter on line 312 is a measure of the total number of high energy photons impinging upon the scintillator 284 within the preset interval of time.

As is apparent from both FIGS. 15 and 16, the relative motion between the masks 234 and 240 produces pulsations in the intensity of radiation incident upon each of the detectors 232A-C. And as will become apparent from the ensuing discussion, these pulsations in the intensity of radiation may be utilized in providing a true image of a radioactive region within the subject 250 by moving the mask 234 in one direction and then rapidly retracting it to its starting position relative to the mask 240 which is retained in a stationary position, or by a movement of the mask 234 in the opposite direction relative to the stationary mask 240, or by moving the mask 234 backwards and forwards relative to the stationary mask 240, or by moving both the masks 234 and 240 in opposing directions. The latter embodiment, while not shown specifically in the figures, can readily be built by providing a second drive screw and rider similar to the drive screw 236 and rider 238 for urging the mask 240 backwards and forwards transversely to the subject 250. The envelope detector 296 of FIG. 17 processes these pulsations to provide an envelope of the maximum intensities in each of these pulsations of the radiation to provide the envelope thereof which, for reasons to be described, is utilized in accomplishing the inverse Fourier transformation of the image of the image plane 280.

Figure 18:
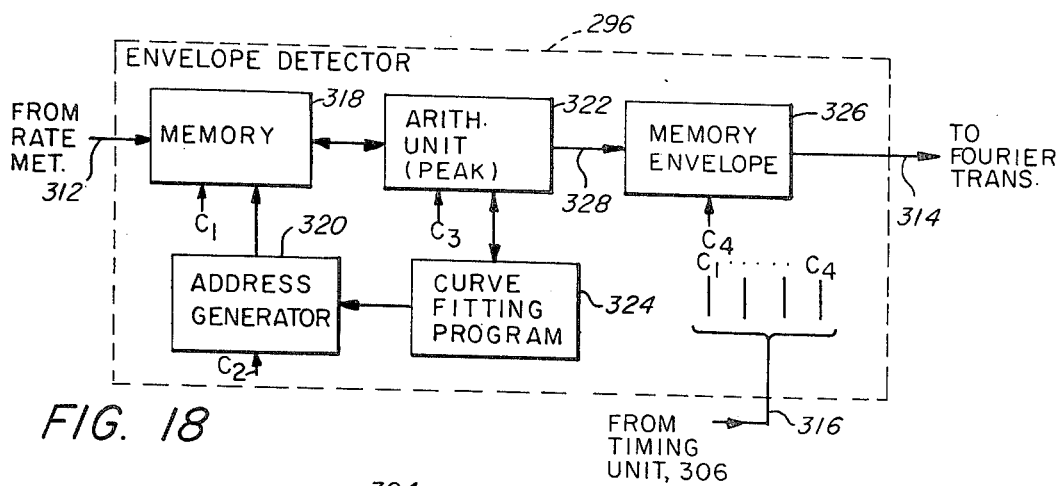
FIG. 18 is a block diagram of an envelope detector of the imaging system of FIG. 17.

Referring now to FIGS. 17 and 18, the envelope detector 296 is seen to receive a digital signal on line 312 representing the magnitude of the count, or rate of occurrence of high energy photons, and clock signals on line 316; the output of the envelope detector 296 appears on line 314. The envelope detector 296 comprises a memory 318, an address generator 320, an arithmetic unit 322, a program unit 324 and a memory 326. The memory 318 stores the digital numbers appearing on line 312. The addresses of the storage locations for each of these numbers is provided by the address generator 320 in response to clock pulses at terminal C2. The arithmetic unit 322, in response to instruction from the program unit 324, performs well-known arithmetic calculations with the digital numbers of the memory unit 318 for plotting a curve or graph of the magnitudes of these numbers for determining the peak values of these numbers, these peak values being transmitted along line 328 to the memory 326. The aforementioned intervals during which the counter of the count rate meter 294 in FIG. 17 counts are substantially smaller than the duration of an individual pulsation in the intensity of radiation incident upon a detector 323 so that many digital numbers on line 312 are available for describing the shape of each pulsation. Thus, the address generator 320 under instruction from the program unit 324 addresses a sufficient number of data points within the memory 318 for tracing out a graph of the pulsations of the radiation so that the arithmetic unit 322 can provide accurate values of the peaks of the pulsations. These peak values with their times of occurence are then stored in the memory 326, the set of stored values being the envelope of the pulsations.

The data points in the envelope are passed from the memory 326 along line 314 into the Fourier transformer 298. Fourier transformer 298 employs well-known circuitry for providing an inverse Fourier transformation utilizing teachings such as those of the aforementioned patent to Bergland for supplying to the memory 300 a set of data points representing a true image of a single line scan. The images of the individual line scans are combined in the following manner by the display system 304.

Figure 19:
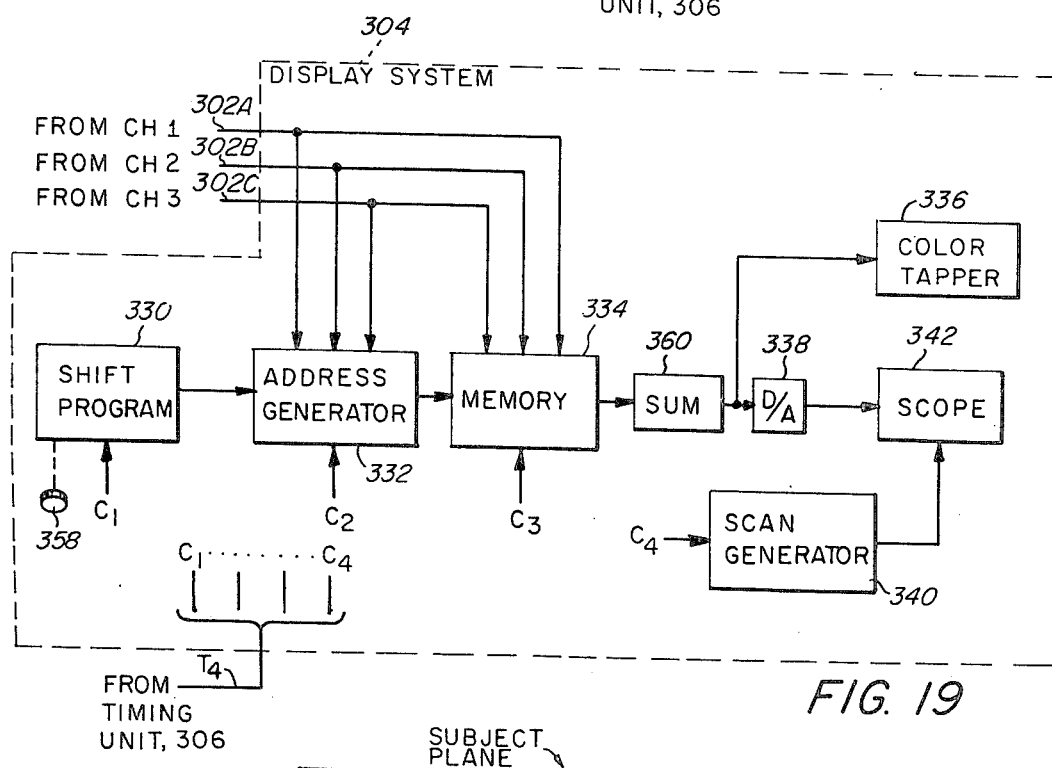
FIG. 19 is a block diagram of a display system of the imaging system of FIG. 17.

Referring now to FIGS. 17 and 19, the display system 304 is seen to comprise a program unit 330, an address generator 332, a memory 334, a color tapper 336, a digital-to-analog converter shown as D/A 338, a scan generator 340, and an oscilloscope 342. With respect to the image plane 280 of FIG. 15, it is noted that each detector 232 sees a different view of the point sources of radiation within the subject 250. Th different views provide depth information by virtue of the manner, to be described hereinafter, in which the different view are combined. The combining is done with a shifting process in which the views of the individual detectors 232 are shifted by the program unit 330 and the address generator 332 in a manner to be explained hereinafter.

Figure 20:
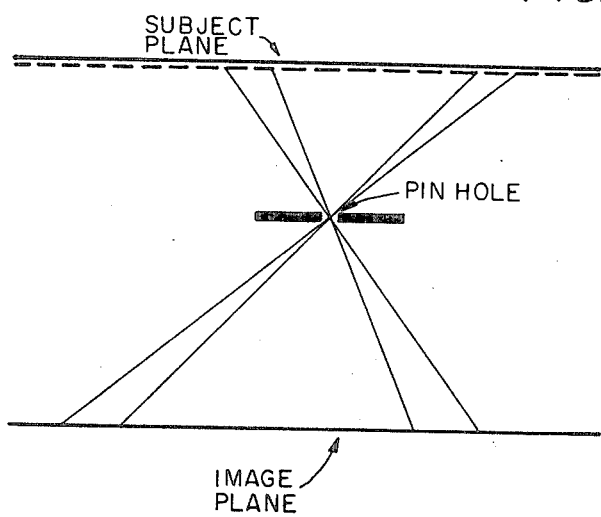
FIG. 20 is a geometric construction useful in describing the relative positions of source points and image points for the structure of FIG. 15.

Referring now to FIG. 20, there is presented a diagrammatic view of a pinhole camera which is analogous to the scanner 228 and 228A in that the magnification of a region on the subject plane as presented on the image plane, is dependent only on the relative spacing between the subject plane and the pinhole and the spacing between the pinhole and the image plane. Thus a portion of the subject 250 in FIG. 15 lying directly below the detector 232A and seen obliquely by the detector 232C are both magnified by an equal amount. This uniformity of magnification is particularly important, for reasons which will become apparent, in combining images obtained with the three detectors 232 wherein the images are combined by shifting their relative positions.

Figure 21:
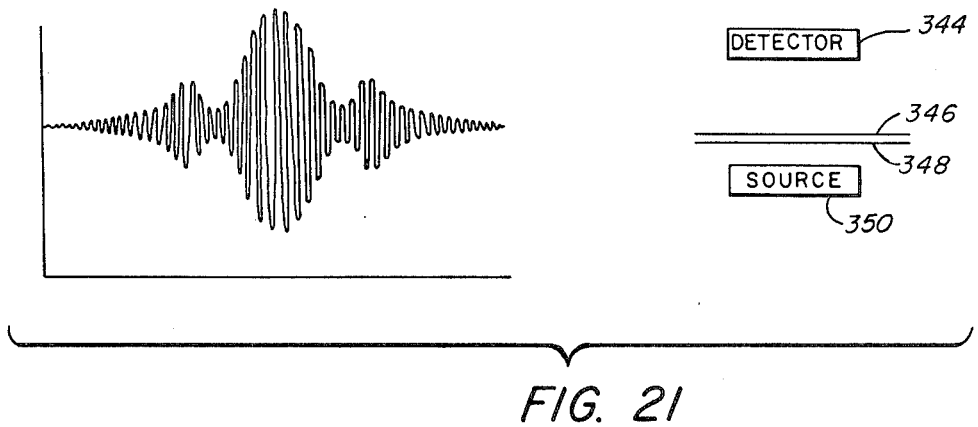
FIGS. 21, 22 and 23 show graphs of the output of a detector of FIG. 15 as a function of position of the moving mask in response to, respectively, a relatively large source of radition, two spaced-apart relatively small sources of radiation, and a single small source of radiation.
Figure 22:
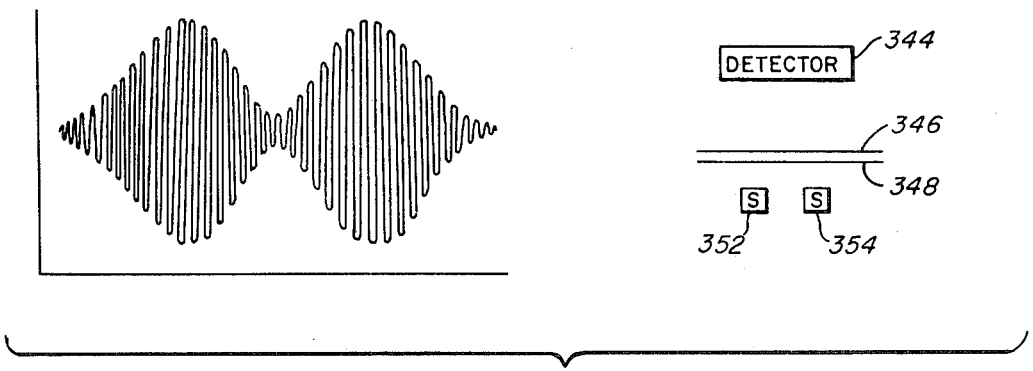
Figure 23:
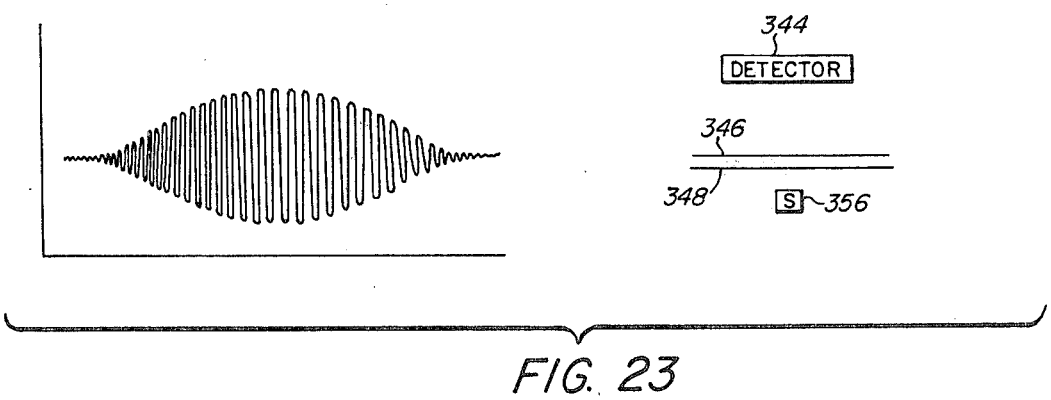

Referring now to FIGS. 21, 22 and 23, there are seen graphs of the output of a detector, such as the detector 232 of FIG. 15, as a function of the relative positions of masks such as the masks 234 and 240 of FIG. 15 in three separate source-detector situations. Alongside each graph is shown diagrammatically the relative positions of a detector 344, an upper stationary mask 346 and a lower moving mask 348. A relatively large area source 350 is shown in FIG. 21, two relatively small spaced apart sources 352 and 354 are shown in FIG. 22 and a single relatively small source 356 is shown in FIG. 23. Typically, the detector 344, as well as the detector 232 of FIG. 15, are each approximately two to three inches in width, the spacing between the detector 344 and the upper mask 346 as well as the spacing between the detector 232 and mask 240 of FIG. 15 are approximately six inches, the combined widths of the masks 346 and 348 as well as the combined widths of the masks 240 and 234 of FIG. 15 are approximately one-half inch, and the spacing between the lower mask 348 and the source 350 as well as the spacing between the mask 234 and the radiation sources of the subject 250 of FIG. 15 are typically three inches. These distances can be varied in accordance with standard photographic practice, for example, the three inch dimension between the mask and the subject can be increased from three to five inches while the 6 inch distance between mask and detector can be increased from 6 to 10 inches. The spacings between the sources 352, 354 and 356 relative to the lower mask 348 in FIGS. 22 and 23 is similarly on the order of three to five inches.

The distinguishing difference between the source-detector configurations of the FIGS. 21-23 is in the sources 350, 352 and 354, and 356. It is readily verified in a simple laboratory experiment in which a source of light is utilized instead of a source of high energy radiation that, upon a movement of the mask 348 relative to the mask 346, and electrical signal produced by the detector 344 in response to light rays passing through the masks 348 and 346 produces the sinuous wave of FIG. 21. In the event that two small light sources are utilized in this experiment, the sinuous curve of FIG. 22 is obtained while in the event that a single small light source corresponding to the source 356 is utilized in this experiment, the sinuous curve of FIG. 23 is obtained. It is readily verified that the envelope of the sinuous curve of FIG. 21 is the spatial Fourier transform of the extended source 350, that the double-humped envelope of the sinuous curve of FIG. 22 is the spatial Fourier transform of the two relatively small sources 352 and 354 which are spaced apart in side by side relation and that the relatively braod-humped envelope of the sinuous curve of FIG. 23 is the spatial Fourier transform of the single relatively small source 356. It is because of the Fourier transform relationships demonstrated in FIGS. 21-23 that the Fourier transformer 298 of FIG. 17 is utilized for providing the inverse transform of the data on line 314 of FIG. 17.

With respect to the source-detector configurations of FIGS. 21-23, it is noted that the transform represented by each envelope is equal to the Fourier transform of the source geometry, with the spatial Fourier frequency components being related to the relative positions of the source, mask and detector as will be described hereinafter in a discussion of the theory of the chirp scanner. Thus, a small detector with a broad source gives the same envelope shape as a small source and broad detector.

Returning now to FIG. 19, the three inverse transformed envelope functions, each of which is a true image of an individual line scan provided respectively by the channels 1, 2 and 3, are applied via the lines 302A-C to the memory 334 and the address generator 332. The address generator 332 alters the addresses of the individual images stored in the memory 334 in accordance with a program provided by the program unit 330, the change in each address being such as to accomplish shifting of the image sideways in the manner taught by U.S. Pat. No. 3,499,146 entitled "Variable Depth Laminography with Means for Highlighting the Detail of Selected Lamina " which issued to A.G. Richards on Mar. 3, 1970, and in the manner taught by an article entitled "A Simplified Procedure for Viewing Multiple Films to Create an Infinite Number of Laminagrams" by Earl R. Miller, M.D., et al appearing on pages 365–367 in the February 1974 edition of the Journal, Radiology. As was mentioned previously with reference to FIG. 20, there is a uniform magnification everywhere in the image plane 280 so that the various true images of the individual line scans appearing on the lines 302A-C may be shifted relative to each other. The amount of shifting is controlled manually by a knob 358 on the program unit 330 in order to focus upon sources of radiation at preselected depths within the subject 250. The signals representing the true images on lines 302A-C are stored in the memory 334 with addresses provided by the address unit 332 and as these images are read out of the memory 334 and into a summer 360, the images in their shifted positions are summed together by the summer 360.

The digital signal provided by the summer 360 is applied to a color tapper 336 which prints out the summation of these images in a manner disclosed in U.S. Pat. No. 3,735,132 which issued to V. Carugati et al on May 22, 1973, and is also converted to an analog voltage by the D/A 338 to be presented on the oscilloscope 342. The scan generator 340 in response to signals obtained on line T4 from the timing unit 306 provides the sweep signals for deflecting the electron beam of the oscilloscope 342 in accordance with the rate at which the signals are read out of the memory 334 by the clock signals at C3. The oscilloscope 342 may alternatively be a storage tube display such as an oscilloscope having a long persistence phosphor for storing the composite image of a line scan during successive indexings of the scanner 228 or 228A so that all of the line scans are visible to present a viewer with a complete picture of the radioactive regions of the subject 250 of FIG. 15.

Again, with reference to FIGS. 21-23, it is noted that the sinuous graph obtained in each of these figures, is obtained by virtue of the fact that the two masks 346 and 348, or 240 and 234 of FIG. 15, are positioned adjacent each other and function as a single reticle having apertures which open and close, the magnitudes of these apertures varying with position along the masks and varying with time in accordance with the relative amount of translation between the two masks. Accordingly, the sinuous curve is obtained in the situation where both masks are moved relative to the detector and relative to each other as well as where only one mask is moved, be it in one direction only or in an oscillatory motion. In the event that the moving mask 234 is scanned alternately to the right and to the left of the subject 250 as the scanner 228 is indexed to advance along the subject 250, the addresses of the address generator 332 have different values than in the situation where the mask 234 scans in only one direction followed by a retraction to its starting point whereupon it again scans in the same direction. However, the continuous reading our of stored data of the memory 334 through the summer 360 is unaffected by the alternate shift in scanning direction.

Again referring to FIG. 16, it is noted that an early embodiment of the invention provided for the placing of the mask 240 on top of the collimator 264 rather than beneath the collimator 264 and above the mask 234. In that embodiment, the signal processing is similar to that already disclosed except tht the extraction of the inverse Fourier transform is more complex in that the transformation has an additional factor based on a structure having essentially two reticles instead of the single reticle previously described with reference to FIGS. 21-23.

General Theory of the Chirp Scanner

Let the source activity distribution be denoted by $f(x,y)$, where the $y$ direction is the conventional scanner or slow scan direction, and the $x$ direction is the coded-aperture or fast scan direction as shown by the coordinate axes 362 of FIG. 16 in which the $xy$ plane is seen to pass through the subject 250. A detector located at the point $x''$, $y''$ views only a narrow strip defined by the lines $y = y_0 \pm \omega/2$, where $\omega$ is the scanner resolution in the $y$ direction. The coded aperture consists of the two masks 234 and 240 in near contact in the $x''Y''$ plane. The transmission of the stationary mask is a function only of $x''$ and is denoted by $g_1(x')$. The transmission of the moving mask 234 is denoted by $g_2(x'-vt)$, where $v$ is the fast scan velocity and $t$ is the time. Radiation emanating from point $x,y$ in the subject plane and passing through the masks at point $x'y'$ strikes the image plane 280 of FIG. 15 at point $x''y''$. The spatial and temporal distribution of radiation $h(x'\lambda',t)$ in the image plane 280 does not depend on the $y''$ coordinate provided that it passes within the collimator 264 of FIG. 16, and is given by:

$$h(x'',t) = C \int_{y_0-w/2}^{y_0+w/2} dy \int_{-\infty}^{\infty} f(x,y)\, g_1(x')\, g_2(x'-vt) \quad (1)$$

where $c$ is a constant determined by the geometry of the system.

It will be convenient to suppress the $y$ integrals by defining $$f(x) \equiv \int_{y_0-w/2}^{y_0+w/2} f(x,y)\, dy. \quad (2)$$

Then, although the $y$ variable will not appear explicitly, it must be remembered that $f(x)$ is the average source activity at point $x$ along the scan line centered at $y = y_0$.

The coordinate $x'$ is related to $x$ and $x''$ by $$x' = ax'' + bx \quad (3)$$

where $$a = \epsilon/(\epsilon+S_2) \quad (4)$$

and $$b = S_2/(\epsilon+S_2) \quad (5)$$

where $S_2$ is distance between film and mask, and $\epsilon$ is distance between mask and subject.

The mask transparencies $g_1$ and $g_2$ are linear chirp (one-dimensional zone plate for which the frequency, but not the spacing, varies linearly with distance) functions defined by $$g_i(x) = \begin{cases} 1 & \text{if } \sin\alpha(x-x_c)^2 \geq 0 \text{ and } |x| \leq L_i/2 \\ 0 & \text{if } \sin\alpha(x-x_c)^2 < 0 \text{ and } |x| \leq L_i/2 \\ 0 & \text{if } |x| > L_i/2 \quad (i=1,2) \end{cases} \quad (6)$$

where $x_c$ is the distance from the center of symmetry of the chirp, at which point the spatial frequency is zero, to the center of the mask itself. The quantities $L_1$ and $L_2$ are the lengths of the stationary and moving masks, respectively. The chirp rate is determined by the parameter $\alpha$.

The tranparency functions may be expanded as $$g_i(x) = \left[\frac{1}{2} - \frac{1}{\pi i} e^{i\alpha(x-x_c)^2} + cc\right] \text{rect}(x/L_i) + \cdots \quad (7)$$

where the rect function is defined by $$\text{rect}(x/L) \equiv \begin{cases} 1 & \text{if } |x| \leq L/2 \\ 0 & \text{if } |x| > L/2. \end{cases} \quad (8)$$

In Eq. (7), only the terms corresponding to the average or D.C. mask transmission and the fundamental spatial frequency band have been shown explicitly. Higher harmonic terms will make a small contribution to $h(x'',t)$ but can be eliminated by filtering.

Substituting Eqs. (2), (3), and (7) into Eq. (1) yields the following rolation:

$$h(x'',t) =$$

$$\frac{-C}{2\pi i} \int f(x) e^{i\alpha(ax'' + bx - x_c - vt)^2} \text{rect}_1 dx + cc$$

$$-\frac{C}{2\pi i} \int f(x) e^{i\alpha(ax'' + bx - x_c - vt)^2}\text{rect}_2 \, dx + cc$$

$$+\frac{C}{\pi^2} \int f(x) e^{i\alpha(ax'' + bx - x_c - vt)^2} e^{i\alpha(ax'' + bx - x_c - vt)^2}$$

$$\cdot \text{rect}_1 \text{rect}_2 \, dx + cc$$

$$+\frac{C}{\pi^2} \int f(x) e^{i\alpha(ax'' + bx - x_c - vt)^2} e^{-i\alpha(ax'' + bx - x_c - vt)^2}$$

$$\cdot \text{rect}_1 \text{rect}_2 \, dx + cc$$

$$+\frac{C}{4} \int f(x) \, \text{rect}_1 \text{rect}_2 \, dx \quad (9)$$

where $$\text{rect}_1 \equiv \text{rect}\frac{ax'' + bx}{L_1} \quad (10)$$

and $$\text{rect}_2 \equiv \text{rect}\frac{ax'' + bx - vt}{L_2} . \quad (11)$$

The notation $cc$ in Equations 7 and 9 indicates the complex conjugate of the preceding term.

Note that all terms on the first three lines of Eq. (9) contain a quadratic phase factor, i.e., a complex exponential with the exponent proportional to $x^2$. This phase factor oscillates rapidly over the range of the $x$ integration, reducing these integrals to a small value.

Thus we need to consider only the last three terms in Eq. (9):

$$h(x'',t) =$$

$$\frac{C}{4} \int f(x) \, \text{rect}_1 \text{rect}_2 \, dx$$

$$+\frac{C}{\pi^2} e^{-i\alpha_1^2 t^2} e^{2i\alpha(ax'' - x_c)vt} \int f(x) \, e^{2i\alpha bxvt}$$

$$\cdot \text{rect}_1 \text{rect}_2 \, dx + cc. \quad (12)$$

A further simplification results if $L_2$ is substantially greater than $L_1$, and $L_1$ in turn is sufficiently large that the entire object area can be seen from each detector point of interest. Then the range of integration is limited by the finite extend of $f(x)$ rather than $g_1$ or $g_2$. In that case the rect functions are superfluous and we may write $$h(x'',t) =$$

$$\frac{C}{4} \int f(x) \, dx + \frac{C}{\pi^2} e^{i\phi(x'',t)} F(2abvt) + cc \quad (13)$$

where $$\phi(x'', t) \equiv -av^2 t^2 + 2a(ax''-x_c)vt \quad (14)$$

and $F(k)$ is the Fourier transform of $f(x)$, defined by $$F(k) \equiv \int f(x) \, e^{ikx} dx. \quad (15)$$

Thus the time signal from a point detector located at $x''$ is given by a constant term proportional to the average source strength plus a rapidly time-varying term whose envelope is the Fourier transform of the source distribution.

The effect of a finite detector area is easily computed by integrating the $x''$ dependence in Eq. (12) over the detector. The integral involved is $$\int_{-\frac{1}{2}L_d}^{+\frac{1}{2}L_d} e^{2i\alpha avtx''} dx'' = \frac{\sin \alpha avt L_d}{\alpha avt} \quad (16)$$

where $L_d$ is the combined length of the three contiguous detectors 232A-C (assumed rectangular). When the subject is in contact with the apertures ($a = O$), then this integral has the value $L_d$. In other words, the detector should be as large as practical. When the subject is separated from the apertures by a gap, $\epsilon > O$, the detector size is restricted by Eq. (16) to about $$L_d \lesssim \frac{\pi}{4\alpha avt_{max}} . \quad (17)$$

It is understood that the above-described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A radiographic scanning system comprising:
   a camera responsive to incident radiation propagating thereto from a subject;
   a mask interposed between said subject and said camera said mask having an elongated region transparent to said radiation and having a predetermined shape;
   means coupled to said camera for displaying an image of said subject; and
   means for moving said camera along said elongated region.

2. A system according to claim 1 wherein said elongated region has the shape of an arc, and wherein said moving means includes a pivot about which said camera is rotated, said pivot being positioned above the center of curvature of said elongated region.

3. A system according to claim 2 wherein the axis of said pivot passes through said camera.

4. A system according to claim 2 wherein said moving means translates said camera along said elongated region, said moving means rotating an axis of said camera about said pivot, said moving means including means for rotating said camera about said camera axis in a direction opposite the direction of rotation of said camera axis about said pivot to provide pure translatory motion of said camera along said elongated region.

5. A system according to claim 1 further comprising means for displacing said elongated region sideways relative to the direction of said motion of said camera.

6. A system according to claim 1 wherein said display means includes count rate means for signalling a rate of occurrence of radiation signals of said radiation incident upon said camera, means for storing count rate signals of said count rate means, and means for combining data of successive ones of said count rate signals to provide said image of said subject.

* * * * *

UNITED STATES PATENT OFFICE
CERTIFICATE OF CORRECTION

Patent No. 4,017,730　　　　　　　　　Dated April 12, 1977

Inventor(s) Harrison H. Barrett

It is certified that error appears in the above-identified patent and that said Letters Patent are hereby corrected as shown below:

Column 1, line 21, change "No," to --No.--;

Column 2, line 10, after "which" delete "th" and insert therefor --the--;

Column 2, line 67, delete "of" and insert therefor --or--;

Column 3, line 50, change "signal" to --signals--;

Column 3, line 53, delete "for" and insert therefor --of--;

Column 4, line 52, delete "arms" and insert therefor --arm--;

Column 5, line 52 delete "scramnbled" and insert therefor --scrambled--;

Column 7, line 36, delete "amd" and insert therefor --and--;

Column 10, line 67, delete "sibject" and insert therefor --subject--;

Column 10, lines 67 and 68, delete the sentence, Thus, the display 44 shows an image of the subject 52."

Column 11, line 51, after "filter" insert --192--;

Column 16, line 43, delete "323" and insert therefor --232--;

Column 17, line 5, delete "view" and insert therefor --views--;

Column 17, line 52, delete "6" and insert therefor --six--;

UNITED STATES PATENT OFFICE
CERTIFICATE OF CORRECTION

Patent No. 4,017,730     Dated April 12, 1977

Inventor(s) Harrison H. Barrett

It is certified that error appears in the above-identified patent and that said Letters Patent are hereby corrected as shown below:

Column 18, line 9, delete "braod" and insert therefore --broad--;

Column 19, line 58, delete " x"Y" " and insert therefor --x'y'--;

Column 19, line 59, delete " x" " and insert therefor --x'--;

Column 19, line 65, delete "h(x' λ',t) and insert therefor --h(x",t)--;

Column 20, line 7, delete "c" and insert therefor --C--;

Column 21, lines 4 and 5, delete "h(x' ',t)" and insert therefor --h(x",t) --;

UNITED STATES PATENT OFFICE
CERTIFICATE OF CORRECTION

Patent No. 4,017,730   Dated April 12, 1977

Inventor(s) Harrison H. Barrett

It is certified that error appears in the above-identified patent and that said Letters Patent are hereby corrected as shown below:

Column 21, line 7, delete " rolation" and insert therefor --relation--;

Column 21, line 63, delete "(2abvt)" and insert therefor --(2$\alpha$bvt)--;

Column 21, line 65, delete "-av$^2$ 1$^2$" and insert therefor ---av$^2$t$^2$--; and Column 21, line 65, delete "2a(ax' ' -x$_c$) and insert therefor --2$\alpha$(ax" -x$_c$)--.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*